US008973862B2

(12) United States Patent
Marcus (10) Patent No.: US 8,973,862 B2
(45) Date of Patent: Mar. 10, 2015

(54) ROTOCRAFT (71) Applicant: Robert Marcus, Lafayette, CA (US)

(72) Inventor: Robert Marcus, Lafayette, CA (US)

(*) Notice: Subject to any disclaimer, the term of this patent is extended or adjusted under 35 U.S.C. 154(b) by 3 days.

(21) Appl. No.: 14/061,723

(22) Filed: Oct. 23, 2013

(65) Prior Publication Data

US 2014/0231594 A1 Aug. 21, 2014

Related U.S. Application Data (62) Division of application No. 12/712,094, filed on Feb. 24, 2010, now Pat. No. 8,590,828.

(51) Int. Cl.
B64C 27/08 (2006.01)
B64C 19/00 (2006.01)
B64C 29/00 (2006.01)
B64C 39/02 (2006.01)
B64D 45/00 (2006.01)

(52) U.S. Cl.
CPC .............. *B64C 19/00* (2013.01); *B64C 29/0058* (2013.01); *B64C 39/024* (2013.01); *B64D 45/00* (2013.01); *B64C 2201/027* (2013.01); *B64C 2201/046* (2013.01); *B64C 2201/088* (2013.01)
USPC .......................... 244/17.23; 244/23 B; 244/1 R (58) Field of Classification Search
USPC .................. 244/12.4, 17.23, 23 B, 54, 55, 56
See application file for complete search history.

(56) References Cited

U.S. PATENT DOCUMENTS

| 275,197 A | 4/1883 | Griffin |
|---|---|---|
| 966,447 A | 8/1910 | Huff |
| 1,242,286 A | 10/1917 | Weinandt |
| 1,406,972 A | 2/1922 | Bryant |
| 1,683,138 A | 9/1928 | Kautz |
| 2,378,913 A | 6/1945 | Dahlander |
| 2,538,719 A | 1/1951 | Shee et al. |
| 2,979,154 A | 4/1961 | Bell |
| 3,228,044 A | 1/1966 | Mattenson |

(Continued)

FOREIGN PATENT DOCUMENTS

| AT | 3 107 U1 | 6/1998 |
|---|---|---|
| DE | 19638704 | 4/1998 |

(Continued)

OTHER PUBLICATIONS

Office Action dated Oct. 4, 2012, issued in U.S. Appl. No. 12/712,094.

(Continued)

*Primary Examiner* — Benjamin P Lee
(74) *Attorney, Agent, or Firm* — Weaver Austin Villeneuve & Sampson (57) ABSTRACT An aerial vehicle includes independently controlled horizontal thrusters and vertical lifters to provide design and operational simplicity while allowing precision flying with six degrees of freedom and use of mounted devices such as tools, sensors, and instruments. Each horizontal thruster and vertical lifter can be mounted as constant-pitch, fixed-axis rotors while still allowing for precise control of yaw, pitch, roll, horizontal movement, and vertical elevation. Gyroscopes and inclinometers can be used to further enhance flying precision. A controller manages thrust applied the horizontal thrusters and vertical lifters to compensate for forces and torques generated by the use of tools and other devices mounted to the aerial vehicle.

11 Claims, 4 Drawing Sheets

(56) References Cited

U.S. PATENT DOCUMENTS

| | | | |
|---|---|---|---|
| 3,301,347 A | 1/1967 | Saita et al. | |
| 3,443,775 A | 5/1969 | Williams | |
| 3,490,547 A | 1/1970 | Steward | |
| 3,496,469 A | 2/1970 | Ebbs-Canavan et al. | |
| 3,633,708 A | 1/1972 | Heilskov | |
| 3,741,340 A | 6/1973 | Andrews | |
| 3,809,181 A | 5/1974 | Staranick et al. | |
| 3,894,613 A | 7/1975 | Elizondo | |
| 4,113,207 A | 9/1978 | Delziel | |
| 4,256,199 A | 3/1981 | Sellards | |
| 4,267,987 A | 5/1981 | McDonnell | |
| 4,401,183 A | 8/1983 | Schler | |
| 4,588,148 A | 5/1986 | Kruchick | |
| 4,770,373 A | 9/1988 | Salo | |
| 4,932,606 A | 6/1990 | Conn | |
| 5,120,101 A | 6/1992 | Vranish | |
| 5,419,514 A | 5/1995 | Ducan | |
| 5,605,205 A | 2/1997 | Douglas et al. | |
| 5,779,188 A | 7/1998 | Frick | |
| 5,823,468 A | 10/1998 | Bothe | |
| 5,890,441 A | 4/1999 | Swinson et al. | |
| 6,260,796 B1 | 7/2001 | Klingensmith | |
| 6,270,038 B1 | 8/2001 | Cycon et al. | |
| 6,286,783 B1 | 9/2001 | Kuenkler | |
| 6,419,190 B1* | 7/2002 | Nguegang | 244/136 |
| 6,655,631 B2 | 12/2003 | Austen-Brown | |
| 6,843,447 B2 | 1/2005 | Morgan | |
| 6,892,980 B2 | 5/2005 | Kawai | |
| 6,969,027 B2 | 11/2005 | Ishiba | |
| 7,267,300 B2 | 9/2007 | Heath et al. | |
| 7,364,114 B2 | 4/2008 | Wobben | |
| 7,857,253 B2 | 12/2010 | Yoeli | |
| 8,152,096 B2 | 4/2012 | Smith | |
| 8,205,820 B2 | 6/2012 | Goossen et al. | |
| 8,251,307 B2* | 8/2012 | Goossen | 244/23 C |
| 8,515,609 B2* | 8/2013 | McAndrew et al. | 701/23 |
| 8,534,983 B2* | 9/2013 | Schoenfeld et al. | 414/739 |
| 8,590,828 B2 | 11/2013 | Marcus | |
| 8,602,348 B2* | 12/2013 | Bryant | 244/12.4 |
| 2003/0047107 A1 | 3/2003 | Thomas | |
| 2003/0116380 A1 | 6/2003 | Xia et al. | |
| 2004/0031646 A1 | 2/2004 | Huang | |
| 2005/0061910 A1 | 3/2005 | Wobben et al. | |
| 2005/0151001 A1 | 7/2005 | Loper | |
| 2005/0178879 A1 | 8/2005 | Mao | |
| 2005/0242602 A1 | 11/2005 | Protesto | |
| 2006/0016930 A1 | 1/2006 | Pak | |
| 2006/0038059 A1 | 2/2006 | Perlo et al. | |
| 2006/0202088 A1 | 9/2006 | Padan | |
| 2006/0226281 A1 | 10/2006 | Walton | |
| 2006/0284002 A1 | 12/2006 | Stephens et al. | |
| 2007/0246601 A1 | 10/2007 | Layton et al. | |
| 2008/0006737 A1 | 1/2008 | Wobben | |
| 2008/0048065 A1 | 2/2008 | Kuntz | |
| 2009/0008499 A1 | 1/2009 | Shaw | |
| 2009/0084890 A1 | 4/2009 | Reinhardt | |
| 2009/0283629 A1 | 11/2009 | Kroetsch et al. | |
| 2010/0044499 A1 | 2/2010 | Dragan et al. | |
| 2010/0217436 A1* | 8/2010 | Jones et al. | 700/245 |
| 2010/0243794 A1 | 9/2010 | Jermyn et al. | |
| 2010/0301168 A1 | 12/2010 | Raposo | |
| 2011/0042509 A1 | 2/2011 | Bevirt et al. | |
| 2011/0042510 A1 | 2/2011 | Bevirt et al. | |
| 2011/0084162 A1 | 4/2011 | Goossen et al. | |
| 2011/0204188 A1 | 8/2011 | Marcus | |
| 2011/0226892 A1* | 9/2011 | Crowther et al. | 244/17.23 |
| 2012/0043413 A1 | 2/2012 | Smith | |
| 2012/0091257 A1 | 4/2012 | Wolff et al. | |
| 2012/0152654 A1 | 6/2012 | Marcus | |
| 2012/0226394 A1* | 9/2012 | Marcus | 701/2 |
| 2013/0152724 A1* | 6/2013 | Mozeika et al. | 74/490.05 |

FOREIGN PATENT DOCUMENTS

| | | |
|---|---|---|
| EP | 2 003 057 | 12/2008 |
| EP | 2465582 | 6/2012 |
| GB | 2490640 | 11/2012 |
| JP | 2009/57044 A | 6/2012 |
| WO | 03/074924 | 9/2003 |
| WO | 2008/025139 | 3/2008 |
| WO | 2011/106320 | 9/2011 |

OTHER PUBLICATIONS

Final Office Action dated May 3, 2013, issued in U.S. Appl. No. 12/712,094.

Office Action dated Aug. 20, 2013, issued in U.S. Appl. No. 12/712,094.

Notice of Allowance dated Oct. 9, 2013, issued in U.S. Appl. No. 12/712,094.

International Search Report and Written Opinion dated Apr. 15, 2011, issued in Application No. PCT/US2011/025741.

Preliminary Report on Patentability dated Aug. 28, 2012, issued in Application No. PCT/US2011/025741.

U.S. Appl. No. 13/474,618, titled "UAV- or Personal Flying Device-Delivered Deployable Descent Device," filed May 17, 2012.

Office Action dated Jun. 5, 2013, issued in U.S. Appl. No. 13/474,618.

Final Office Action dated Oct. 31, 2013, issued in U.S. Appl. No. 13/474,618.

Office Action dated Mar. 24, 2014, issued in U.S. Appl. No. 13/474,618.

Office Action dated Apr. 12, 2012, issued in U.S. Appl. No. 12/969,421.

Final Office Action dated Jul. 23, 2012, issued in U.S. Appl. No. 12/969,421.

Office Action dated Mar. 27, 2013, issued in U.S. Appl. No. 12/969,421.

Office Action dated Aug. 23, 2013, issued in U.S. Appl. No. 12/969,421.

VBSS Steel Caving Ladder, downloaded on Mar. 9, 2011 from http://climbinggcarinc.com/lm-steel-caving-ladder-p-4806.html.

Extended European Search Report dated Jun. 14, 2013, from Application No. 11193009.5.

Paul Y. Oh et al., "Designing an Aerial Robot for Hover and Stare Surveillance", IEEE International Conference on Advanced Robotics, pp. 303-308, Seattle WA, Jul. 2005. Retrieved on Feb. 25, 2010 from http://prism2.mem.drexel.edu/-paul/papers/ohIcar2005.pdf.

Wikipedia "Gyrodyne", downloaded on February http://en.wikiredia.org/wiki/Gyroclyne.

"A Mule that flies", Machine Design.com, Sep. 24, 2009.

"Draganflyer RC Helicopters in VECPAV Autonomous Control System At Vanderbilt University, NV USA," downloaded Sep. 15, 2009, http://www.rchelicopter.com/2007/11/22/draganilyer-uav-vanderbilt-universitydrone/.

S. Salazar et al. Modeling and Real-Time Stabilization of an Aircraft Having Eight Rotors, Journal of Intelligent and Robotic Systems, vol. 54, Nos. 1-3, Mar. 2009, pp. 455-470.

"Oemichen 1922," downloaded Sep. 21, 2009, http://www.aviastar.orgthelicoptersengloemichen.php.

Tim Lynch, "The Heli-Claw: A New Way to Transport Mulch for Erosion Control", U.S. Dept. of Agriculture Forest Service, Technology & Development Program, May 2008.

* cited by examiner

ROTOCRAFT

CROSS-REFERENCE TO RELATED APPLICATION

This application is a divisional of and claims priority to U.S. patent application Ser. No. 12/712,094, entitled "ROTOCRAFT" filed Feb. 24, 2010, now U.S. Pat. No. 8,590,828, which is incorporated herein by reference in its entirety and for all purposes.

BACKGROUND

Conventional rotorcraft, such as helicopters, are difficult to build, operate, and maintain. Training helicopter pilots requires substantial time and effort. Helicopter controls typically include a cyclic pitch control, a collective pitch control, anti-torque pedals, and a throttle. The cyclic pitch control is used to change the pitch of the rotor blades in order to change the horizontal flying direction of the helicopter. It should be noted that a typical helicopter uses the same rotor (i.e., the main rotor) for both vertical elevation and horizontal motion. A helicopter can be propelled forward by tilting the rotor disk, but this also affects vertical elevation. Such coupling substantially complicates flight controls. The collective pitch control is used to change the angle of all rotor blades collectively in order to change vertical elevation of the helicopter. The anti-torque pedals are used to control the direction in which the nose of the helicopter is pointed. The pedals are generally used to change force output of an anti-torquing device, such as a fantail. The throttle is used to control power output of the main engine, which may change the rotational speed of the main rotor and impact both vertical elevation and horizontal Such flight control complexity makes operation and maintenance of rotorcraft an ongoing challenge. Yet, most rotorcraft still lack the ability to make precise aerial maneuvers and can not be relied upon to operate in confined spaces. Further, rotorcraft are generally not capable of performing operations that exert forces on other objects.

Consequently, the techniques and mechanisms of the present invention provide a more easily maintained and operated aerial vehicle that can maneuver in confined spaces and/or can use mounted devices such as mechanical tools, sensors, and instruments.

SUMMARY

An aerial vehicle includes independently controlled horizontal thrusters and vertical lifters to provide design and operational simplicity while allowing precision flying with six degrees of freedom and using mounted devices such as mechanical tools, sensors, and instruments. Each horizontal thruster and vertical lifter can be mounted as constant-pitch, fixed-axis rotors while still allowing for precise control of yaw, pitch, roll, horizontal movement, and vertical elevation. Gyroscopes and inclinometers can be used to further enhance flying precision. A controller manages thrust applied by the horizontal thrusters and vertical lifters to compensate for forces and torques generated by the use of tools and other devices mounted on the aerial vehicle.

DETAILED DESCRIPTION OF EXAMPLE EMBODIMENTS

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

A rotorcraft or rotary wing aircraft is a heavier-than-air aerial vehicle that uses lift generated by its rotor blades revolving around a mast. A mast is sometimes referred to as a shaft. A rotor includes a mast and multiple rotor blades (typically between two and six blades) mounted to the mast. A rotorcraft can use one or more rotors to provide vertical lift and/or horizontal thrust. Rotors on vertical masts and other vertical force generating devices are referred to herein as vertical lifters. Rotors on horizontal masts and other horizontal force generating devices are referred to herein as horizontal thrusters. Vertical lifters and/or horizontal thrusters may include rotors, turbines, rockets, and/or static lifting surfaces.

Examples of rotorcraft include helicopters, autogyros, and gyrodynes. Helicopters typically have a main rotor along with an anti-torque device, such as a tail rotor or a fantail. As mentioned above, helicopter controls are complex. An autogyro utilizes an unpowered rotor driven by aerodynamic forces to develop vertical lift and a powered propeller or a turbine to provide horizontal thrust. The unpowered rotor rotates by air flowing up and through the rotor disk. The air rotates the rotor and generates vertical lift. Another example of a rotorcraft, a gyrodyne, has a main powered rotor for takeoff and landing. Anti-torque and horizontal propulsion are provided by one or more other propellers providing horizontal thrust. As power to the horizontal thrust propellers is increased, less power is provided through the main rotor. At cruise speeds most or all of the thrust being provided by the propellers. The main rotor receives power only sufficient to overcome the profile drag and maintain some lift.

In certain embodiments, an aerial vehicle has two or more vertical lifters. When two vertical lifters are rotors, these rotors may be arranged in tandem (one rotor in front of the other), transversely (side by side), or coaxially (one rotor disc above the other, with concentric drive shafts). When three of more vertical lifters are used, they may be positioned at the corners of the aerial vehicle to provide better control of pitch and roll. In particular embodiments with at least two rotors, the rotor blades may intermesh, i.e., the rotor discs may pass through each other, where the blades are synchronized so that they intermesh without touching each other.

Complex controls used on some aerial vehicles are difficult to automate or operate. Further, using various devices mounted on an aerial vehicle while flying or hovering may be difficult or impossible.

A particular example of an aerial vehicle is an unmanned aerial vehicle (UAV). UAVs are used primarily for reconnaissance. Conventional UAVs are generally capable of aiming sensors during level flight or hovering. However, UAVs can not aim precisely during complex maneuvers, for example, when pitch, roll, and yaw are changed simultaneously. Further, conventional UAVs are generally not capable of performing mechanical operations, such as opening doors, that may be particularly useful during indoor surveillance.

To overcome certain problems described above, a novel aerial vehicle is equipped with separate and independently controlled vertical lifters and horizontal thrusters. In certain embodiments, hardware and control functions are designated such that vertical elevation, horizontal motion, yaw, pitch, and roll can be independently controlled. This allows precise flying without a need for complex flight controls. In addition, the independent control simplifies the task of keeping a device (e.g., a tool, weapon, sensor) aligned with a target. In particular embodiments, the alignment of the tool or sensor may need a movement only within a single plane. An operator (e.g., an onboard or remote pilot, a tool operator) can manually adjust the device alignment to keep the device on a target. Further, the independent control facilitates and simplifies automating certain flight control and tool operation functions. Certain hardware and control aspects are described in the context of FIGS. 1 and 2 respectively.

Independent control of vertical lift and horizontal thrust allows high maneuverability and ease of control. Further, moving parts of vertical lifters and horizontal thrusters may be protected such that an aerial vehicle may fly in confined spaces and contact and manipulate other objects. In certain embodiments, an aerial vehicle is configured to use tools, weapons, and sensors. Examples of sensors include electromagnetic spectrum sensors (e.g., visual spectrum, infrared or near infrared cameras, radar systems, microwave and ultraviolet spectrum sensors), biological sensors (e.g., for detecting the airborne presence of various microorganisms and other biological factors), chemical sensors (e.g., laser spectroscopy), and other types of sensors.

Other functions of the aerial vehicle may include ability to enter and exit through windows, negotiate stairs, and operate a mechanical claw or other tools. For example, an aerial vehicle may include gyroscopic and range sensors to control flight stability and adjust position relative to a target while the vehicle performs complex maneuvers. Some of these functions may be automated. Further, independent control of horizontal thrusters and vertical lifters allows use of fixed pitch rotors. Vertical control including elevation and horizontal stability (e.g., pitch and roll angles) may be achieved by varying power output of the vertical lifters. For example, if vertical lifters are rotor-based, the rotational speed of each lifter may be independently controlled. A fixed pitch design has fewer moving parts and simplifies control and maintenance.

In certain embodiments, vertical lifters are not movable or pivotable and can only provide forces along the same constant axis. For example, if vertical lifters are rotor based, the shafts of these rotors are fixed and can not tilt like a shaft in a conventional helicopter. In particular embodiments, the axes for two or more vertical lifters are substantially parallel. Vertical lifters along with horizontal thrusters may be fixed to a rigid frame.

A closed loop feedback control system may be used to collect information about changes in attitude, roll, pitch, and yaw, and to control vertical lifters and horizontal thrusters. In certain embodiments, the control system may be used for automatic control of certain flight functions, e.g., providing horizontal and/or vertical stability or maintaining a set distance to target objects. Other functions may be controlled by an operator using a communication system. Feedback information may be provided by various sensors, such as inclinometers, cameras, and/or gyroscopes. Sensor output may be used to adjust vertical lift or horizontal thrust forces.

In certain embodiments further described below, an aerial vehicle includes four fixed vertical lifters and two fixed horizontal thrusters. Four rotor based vertical lifters may be configured in such as a way that two rotors may rotate in one direction and the other two may rotate in the other direction to compensate for torque created by the rotors. In particular embodiments, horizontal thrusters are used to compensate for the torque generated by the vertical rotors.

According to various embodiments, an aerial vehicle is equipped with vertical and/or horizontal rangefinders (e.g., proximity sensors) to determine a position of the aerial vehicle relative to nearby objects. Output of these range finders may be used to automatically control position of the aerial vehicle. These automated adjustments help to maintain the aerial vehicle stability in demanding conditions. In particular examples, an operator sets an automated flying position by providing vehicle coordinates and/or orientation relative to other objects. Automating some flying control function helps the operator to focus on other functions, such as operating a mechanical tool or instrument mounted on the aerial vehicle.

In certain embodiments, horizontal thrusters are capable of providing horizontal thrust forces in both directions along the thrust axis (i.e., pull and push the aerial vehicle). For example, an aerial vehicle may be turned faster if two substantially parallel horizontal thrusters provide thrust forces in opposite directions.

Moving parts of vertical lifters and/or horizontal thrusters (e.g., rotor blades) may be protected by shields to allow the aerial vehicle to come in contact with objects without losing control or damaging its components. For example, a circular cylinder-like shield or a wire-shield may be used around the blades without substantially interfering interferences with air flow created by the blades.

Figure 1:
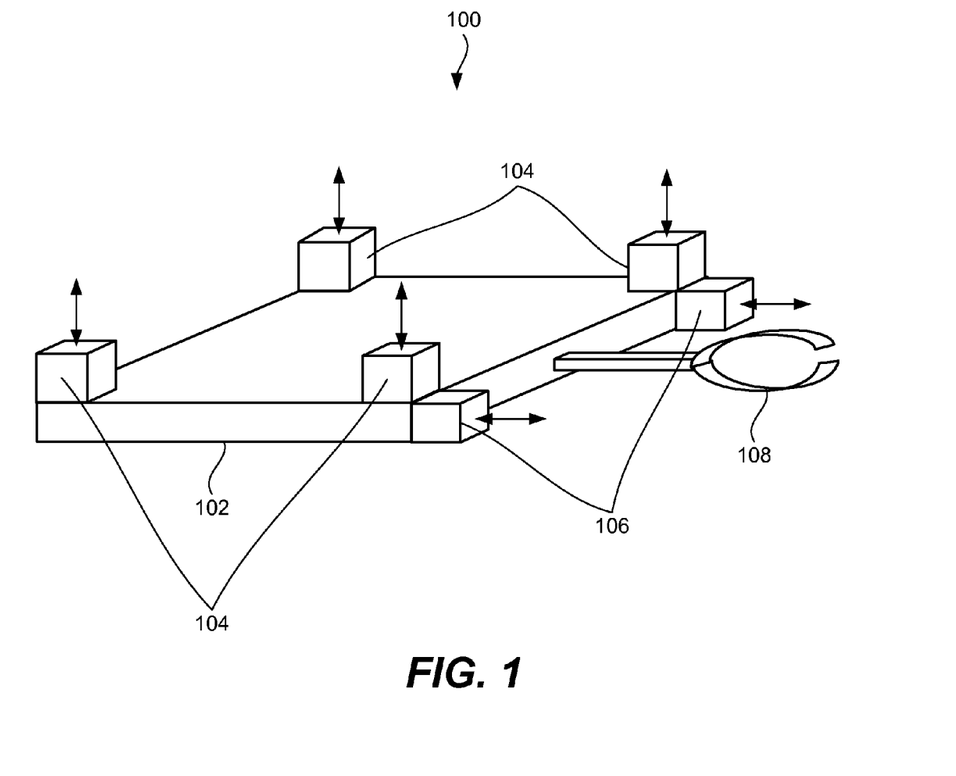
FIG. 1 illustrates an example of an aerial vehicle in accordance with certain embodiments.

Various aerial vehicle structural and functional features will now be described in reference to the figures. FIG. 1 is a schematic representation of an aerial vehicle 100 in accordance with certain embodiments. An aerial vehicle 100 may include a frame 102, one or more vertical lifters 104, and/or one or more horizontal thrusters 106. The vertical lifters and the horizontal lifters can be attached to or mounted on the frame 102. Other elements of the aerial vehicle may include a device 108 attached to the frame 102. The device may be configured to move at least a portion of the device relative to the frame, e.g., a mechanical claw. In other embodiments, all parts of the device are stationary, e.g., a sensor. An aerial vehicle may be equipped with a controller (not shown) configured to control the horizontal thrusters, the vertical lifters, and/or the one or more devices mounted to the aerial vehicle.

A frame 102 may be a rigid structure made out of light weight materials, such as aluminum, plastic, and composite materials. The frame 102 may be used to support other components of the aerial vehicle, such as thrusters, lifters, tools, and/or sensors. In the context of this document, the frame 102 is sometimes used as a point of reference for motion of various components (e.g., movement of at least a portion of the tool relative to the frame).

Vertical lifters 104, which sometimes are also referred to as vertical thrusters, are used to provide vertical lift force, at least in the direction that is opposite to the gravitation force. Generally, the combined force output of all vertical lifters should exceed the weight of the aerial vehicle. Vertical lifters 104 may also be used generate vertical forces in the direction of the gravitational force (i.e., push the vehicle down). This feature may be used to overcome torque exerted by the device (e.g., opening a door knob) and/or to press down on an object. It should be noted that vertical lifters 104 may also generate some horizontal thrust force, e.g., when a lifter or an entire vehicle is tilted or when a rudder is used.

A number of vertical lifters is determined based on a force output of each lifter, weight of the aerial vehicle, simplicity of control, maneuverability requirements, and other considerations. In particular embodiments, an aerial vehicle 100 has one vertical lifter 104, which may be coupled with one or more horizontal thrusters 106 or used without any horizontal thrusters at all. If no horizontal thrusters are used, then horizontal forces may be provided by using a rudder, pivoting the vertical lifter itself, and/or positioning vertical lifters at an angle with each other and controlling their force outputs. This design (with a single vertical lifter) may be beneficial from weight perspective, but control functions are complex and maneuverability is limited. In certain embodiments, an aerial vehicle has at least two vertical lifters. In the same or other embodiments, an aerial vehicle has at least one vertical lifter and at least one horizontal thruster. Such embodiments may be more suitable when an aerial vehicle needs to deliver some torque to external objects.

Higher maneuverability may be achieved by using additional lifters and thrusters. In certain embodiments, an aerial vehicle has four vertical lifters and two horizontal thrusters that are mounted to the frame without pivoting capabilities. Flying control is performed primarily by adjusting forces delivered by each thruster and lifter. In particular embodiments, forces delivered by vertical lifters are parallel to each other. In the same or other embodiments, forces delivered by horizontal thrusters are parallel to each other. Further, the vertical control (e.g., altitude changes, pitch, and roll) of the aerial vehicle may be provided by adjusting forces delivered by the vertical lifters, while the horizontal controls (e.g., forward and backward motions and yaw) may be provided by adjusting forces delivered by the horizontal thrusters. In certain specific embodiments, one or both horizontal thrusters are capable of providing forces in two directions. In certain specific embodiments, up to four horizontal thrusters are capable of providing forces in four directions, allowing lateral movements as well as forward and backward movements and yaw.

In certain embodiments, vertical lifters and horizontal thrusters do not pivot relative to the frame and/or do not have corresponding rudders. Therefore, flight controls are performed by adjusting forces of the lifters and thrusters. In other embodiments, one or more vertical lifters and/or horizontal thrusters pivot relative to the frame to provide additional control flexibility. In the same or other embodiments, one or more vertical lifters and/or horizontal thrusters have one or more corresponding rudders. Pivoting may be performed based on output provided from the controller as further described in the context of FIG. 2. Further, the controller may be used to change forces delivered by vertical lifters and horizontal thrusters. In particular embodiments, one or more horizontal thrusters include shafts configured to change rotating speeds and rotating directions based on inputs provided by the controller.

Vertical lifters and/or horizontal thrusters may be of many types, such as fixed pitch propellers, turbines, rockets, compressed air devices, etc. Examples of power sources for vertical lifters and/or horizontal thrusters having a propeller configuration include an electrical motor and a combustion engine. Typically, each lifter and thruster has its own designated power source, which may be controlled independently to change force provided by each lifter and thruster. However, in particular embodiments, an aerial vehicle may have a power source and a power transmission delivering power from the power source to two or more lifters and/or thrusters, such that two or more lifters and/or thrusters can deliver variable (relative to each other) forces (e.g., speeds in propeller configuration embodiments).

In certain embodiments, a controller may engage vertical lifters and/or horizontal thrusters to reduce the effect of recoil forces generated by a tool or weapon, either manually or automatically (e.g., by a set of pre-programmed instructions). For example, an aerial vehicle may adjust force outputs of certain lifters and/or thrusters together with initiating an action with a tool or weapon. In certain embodiments, an aerial vehicle is moved from its predetermined position prior to the tool or weapon exerting any force on the aerial vehicle in order to minimize the overall amplitude of the deviation from the predetermined position when the force is generated. This option may be used for forces that are high in magnitude but short in duration, such as punching a rivet or firing a bullet.

In certain embodiments, vertical lifters and/or horizontal thrusters may be used to apply force on external objects through a tool, a frame, or other components of the vehicle. For example, an aerial vehicle may be used for pushing objects (e.g., opening a door, moving a box), inserting or pushing a wedge, breaking through the objects (e.g., windows, walls, doors), and exerting forces to perform other functions. Further, a tool may be used to open and close doors and windows, apply sensors to objects, establish electrical connection with power sources, and perform other functions. Particular embodiments of an aerial vehicle used to open door knobs are described in the context of FIGS. 4A-4C. In certain embodiments, vertical lifters and/or horizontal thrusters may additionally be used during application of external forces to stabilize the vehicle (e.g., maintaining it horizontally stable or compensating for reactive forces or torques exerted by objects onto which forces or torques have been applied).

Returning to FIG. 1, in certain embodiments, an aerial vehicle includes one or more devices 108 that may be mechanical tools (e.g., a mechanical claw, a punch), sensors (e.g., temperature sensor, proximity sensor, video camera, laser scanner, etc), and/or weapons (e.g., a gun, an explosive charge, a missile). The device 108 may be attached to the frame 102. A portion of the device 108 may be movable relative to the frame 102. In certain embodiments, the motion of the device 108 relative to the frame 102 is capable of exerting a force adequate for useful work. Additional details of device are described in the context of the FIG. 2 and FIGS. 4A-4C.

Figure 2:
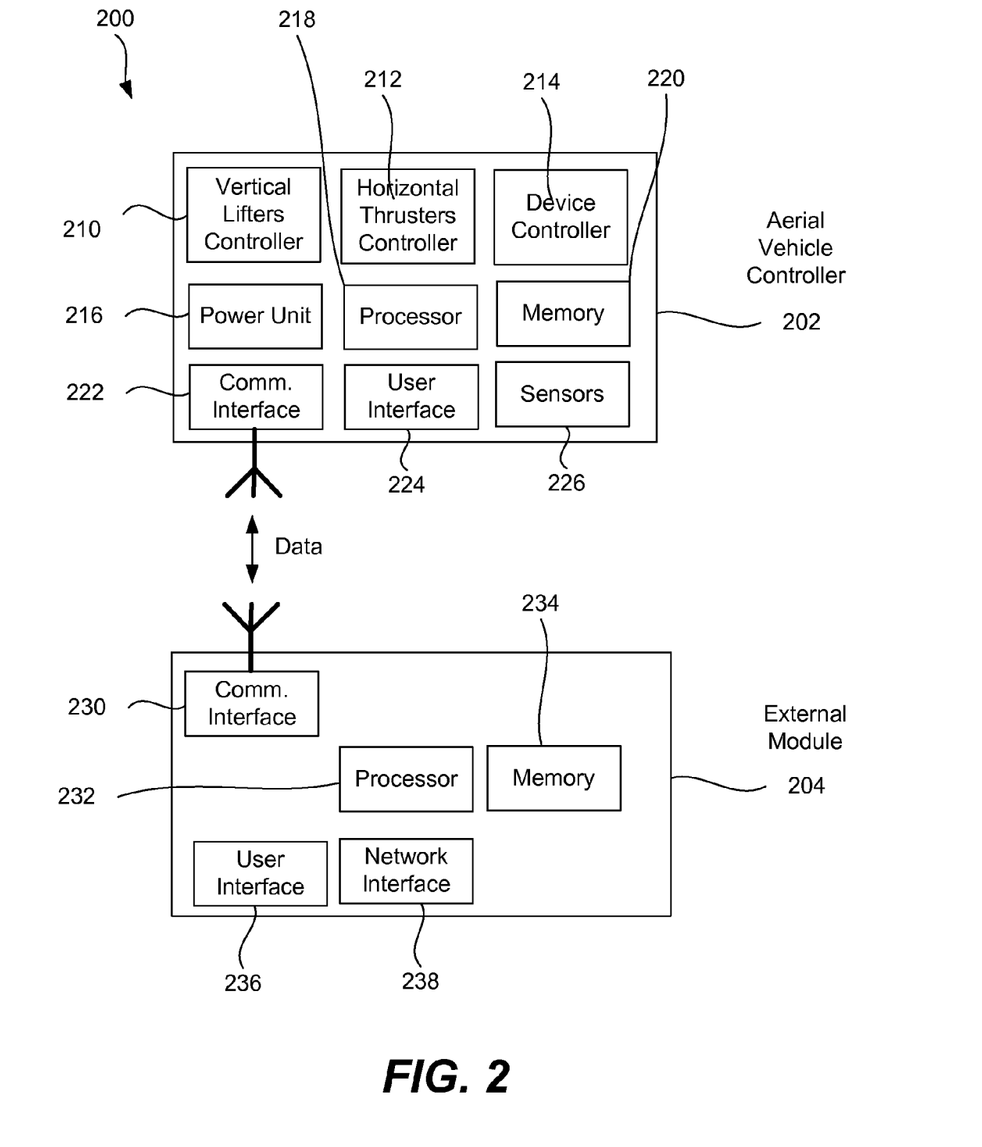
FIG. 2 illustrates an example of a control system including an aerial vehicle controller and an external module in accordance with certain embodiments.

FIG. 2 illustrates a control system 200 in accordance with certain embodiments. A control system 200 includes an aerial vehicle controller 202 positioned on the vehicle. For example, the controller 202 may be attached to the frame. In certain embodiments, the control system 200 also includes an external module 204 that communicates with the vehicle controller 202. The overall system 200 is configured to transmit data between the aerial vehicle controller 202 and the external module 204, such as data related to flight control and device operation, data collected by sensors, and other forms of data.

An aerial vehicle controller 202 may include one or more input modules, such as a communication interface 222, a user interface 224 (including various user input and output features), and one or more sensors 226. The communication interface 222 may be any device capable of establishing wireless communication with the external module 204 (or any other external communication device) and transmitting data between the controller 202 and the module 204. In particular embodiments, the communication interface 202 is a radio transmitter. Each control function of the aerial vehicle (e.g., a force output of each thruster and lifter, a device control, sensors outputs) may have a dedicated radio channel. Radio transmission may be performed in FM-frequency range and modulated with a pulse position modulation or a pulse code modulation technique. Furthermore, spread spectrum based on frequency hopping in the 2.4 GHz band or other frequency bands may be used for communication.

A user interface 224 may be provided on the controller 202 to allow for direct input of data by a user/pilot (e.g., programming a new flight path or controlling a manned vehicle during the flight). Examples of user interfaces include displays (e.g., touch screens), keyboards, joysticks, levers, and pedals. Furthermore, the controller 202 may include one or more communication links, such as serial ports. According to various embodiments, an aerial vehicle is an unmanned aerial vehicle that has a controller 202 to receive, process, store, transmit, and generate various flight control and device operation instructions.

A controller 202 may include one or more sensors 226 for gathering information around the aerial vehicle. Examples of the sensors include a video camera, a proximity sensor, an inclinometer, a gyroscope, a temperature sensor, a positioning system (e.g., a satellite based global positioning system, a radio/cell phone based triangulation system), etc. For example, an inclinometer or a gyroscope may generate information used for horizontal alignment of the aerial vehicle. Sensor information may be used by the controller 202 to send instructions to the vertical lifters and/or horizontal thrusters to adjust their force outputs. In certain embodiments, a gyroscope is configured to automatically control vertical lifters to continuously maintain stability.

Furthermore, a controller 202 may include a power unit 216 that is shared with other components of the aerial vehicle, such as vertical lifters or horizontal thrusters. A power unit 216 may include an energy carrying device (e.g., a battery, a capacitor) or a generating device (e.g., a generator). The power unit 216 may also include a charger for charging the energy carrying device. According to various embodiments, the aerial vehicle includes an electrical plug or electrical wires that can be plugged into an electrical outlet during remote operation. In particular embodiments, the electrical plug or electrical wires can be inserted into an electrical outlet during the mission, e.g., while the aerial vehicle is used to survey a building interior.

The controller 202 may also include a processor 218 and a memory 220. Examples of tangible computer memory types include a hard-drive, a flash memory, a recorded disk, and other tangible memory storage devices. The memory 220 may be used to store a set of instructions for controlling vehicle operations. The processor 218 may be configured to process and execute these instructions.

An aerial vehicle controller 202 may also include one or more output devices, such as a vertical lifter controller 210, a horizontal thruster controller 212, and a vehicle device controller 214. Further, in embodiments where a thruster or a lifter is pivotable or has a corresponding rudder, an output device may be used to control some or all functions associated with pivoting the lifter, thruster, and/or rudder.

In certain embodiments, flight control functions of an aerial vehicle can be fully automated and require no ongoing input from a pilot either on board the vehicle through an external module. An automated flight control may use inputs from sensors, maps, pre-loaded information, etc. Generally, automated controls are more suitable when flight paths are known. For example, a map of an open space or a building may used for navigation. Various sensors may also be used to assist with certain navigation functions (e.g., avoiding collisions with objects on the flying path and maintaining distance from objects).

In particular embodiments, a part of navigation is performed manually (e.g., by a pilot on the ground controlling the vehicle through the external module). For example, a pilot may remotely guide the vehicle to a target inside a building relying on video images provided by the vehicle's video cameras and transmitted to the external module for the pilot to view. During this guiding process, the vehicle controller may continuously record its flying coordinates. In other words, the vehicle controller constructs a map of its flying path. This map may be later used by this or other vehicles, for example, to exit using an automatic flying mode (with little or no assistance from a pilot). This feature may be particularly useful in situations when fast exit from enclosed spaces is required, such as rescue or assault operations.

According to various embodiments, some flying control functions are automated, while other flying control functions are performed by a pilot (e.g., remotely through the external control module). For example, an aerial vehicle may use gyroscope data to automatically maintain horizontal stability while other flight motions are performed manually. In another example, automated control is used to maintain a stable position of the vehicle relative to the target (e.g., a stable hovering position), while a pilot operates a tool, sensor, and/or weapon. In particular embodiments, the controller provides input to horizontal thrusters and/or vertical lifters based on feedback from sensors in order to maintain constant roll, pitch and yaw, while the device is remotely controlled by a pilot (or an operator) based on information provided by sensors (e.g., a video camera directed at the target).

Generally, an aerial vehicle is remotely flown by a pilot through an external module, while the vehicle controller is used to ensure certain flight functions (e.g., horizontal stability, elevation, distance from surrounding objects) based on sensor feedback. In certain embodiments, most or even all flight control functions are performed remotely by a pilot. It should be noted that when certain control functions are automated, the automation process may be implemented at an aerial vehicle controller 202, an external module 204, or some other computer system (not shown in FIG. 2).

According to various embodiments, an external module 204 of the control system 200 sends control commands to and receives responses from the aerial vehicle. The external module 204 may include a module communication interface 230 for exchanging data with the vehicle communication interface 222. In particular embodiments, the external module has a module processor 232 and module memory 234. The external module 204 may also include a module user interface 236, which may allow control personnel to receive output and provide input. Examples of user interfaces include displays (including touch screens), keyboards, joysticks, levers, and pedals. The external module 204 may also include one or more communication links, such as serial ports.

Figure 3:
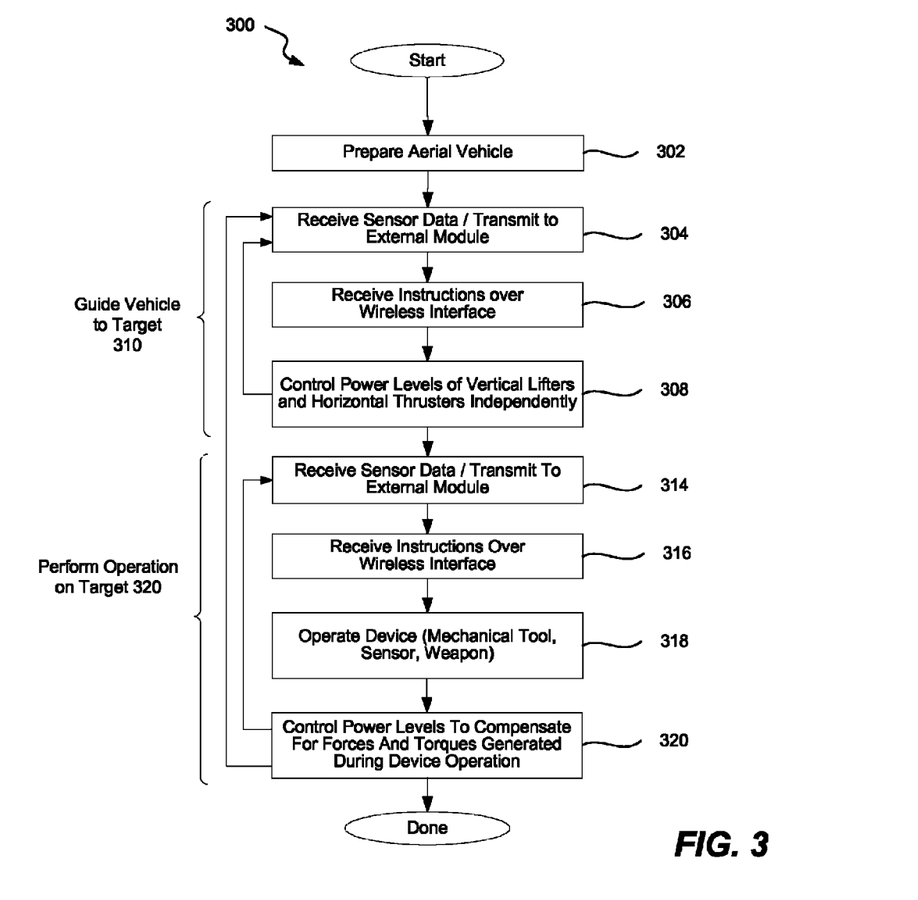
FIG. 3 illustrates a process of controlling an aerial vehicle in accordance with certain embodiments.

Certain features of aerial vehicles are best illustrated by describing operations of the vehicle. FIG. 3 illustrates an example where an aerial vehicle is used for indoor surveillance in accordance with certain embodiments. The process 300 may start with preparing an aerial vehicle for a mission (block 302), which may involve charging a vehicle power unit (e.g., charging battery and/or filling with fuel), installing modular equipment on the aerial vehicle (e.g., attaching another tool, sensor, or weapon to the frame), and uploading a set of instructions to the memory of the aerial vehicle controller. Some of these operations (e.g., uploading instructions) may continue throughout the entire process 300.

When a vehicle is ready for a mission, it may be guided to the first target, which may involve performing a series of operations 310. Some or all data used for guidance of the aerial vehicle may be provided by vehicle's sensors (block 304). In certain embodiments, the data is also transmitted to the external module. Further, a vehicle may be guided using instructions entered by an operator/pilot on the user interface of the external module. These instructions are then received by the aerial vehicle over a wireless communication interface (block 306). At some point in this operation, instructions may be processed by the processor of the external module and may be stored in the memory of the external module. Furthermore, the instructions may come to the external module from a remote computer system through some network interface, instead of being input by an operator.

In certain embodiments, the control of the vehicle is performed entirely by the aerial vehicle controller without receiving any flight control external instructions (i.e., process 300 does not include operation 306). The external module may be used solely to receive information from the vehicle or not used at all. Autonomous operation of the aerial vehicle may be needed in areas where communication with external modules may be difficult to establish (e.g., flying close to or inside metal structures, power lines, or bulk liquids that tend to interfere with radio communication). An aerial vehicle may guide itself to the target based on the preloaded instructions and sensor data (provided in operation 306). In a particular embodiment, a pilot onboard of the aerial vehicle guides the vehicle to its target (group 310) and/or operates a device at a target (group 320) with or without sensor data and wirelessly received instructions.

Sensor data (from operation 304) and/or instructions (from operation 306) may be used to independently control power levels applied to each vertical lifter and horizontal thruster in order to control the flying path of the aerial vehicle (operation 308). A vehicle may continuously receive new sensor data and/or new instructions for further guidance. In particular embodiments, one or more operations in group 310 are repeated.

An aerial vehicle may transmit certain data collected by its sensors (e.g., video images from the video camera) to the external module. According to various embodiments, the data is presented on the user interface and used by an operator/pilot to generate a set of flight control and device operation instructions (e.g., based on received video images) that are transmitted back to the aerial vehicle in operations 306 and 316.

Once an aerial vehicle reaches the target, it may perform one or more operations directed at the target (group 320). For example, an aerial vehicle may take video or still images of the target, measure temperature and other characteristics of the target, and/or perform mechanical actions on the target. In certain embodiments, an aerial vehicle receives data collected from sensors (block 314) and/or receives instructions over a wireless interface (block 316) that are used for controlling a device, such as a mechanical tool, a sensors, or an instrument or weapon, during its operation (block 318). In certain embodiments, the data is also transmitted to the external module.

Some operations in groups 310 and 320 may be repeated to guide an aerial vehicle to another target and perform operation on that target. Further, in certain embodiments, operations in groups 310 and 320 are performed simultaneously. Certain flight control functions need to be performed in order to maintain the aerial vehicle at a desired position relative to the target. For example, vertical lifters and horizontal thrusters may be controlled to counterbalance force and/or torque exerted by the vehicle's device on the target.

In particular examples, an operation may involve opening a door, a window, or another obstacle with a latch or a lock. For example, during interior surveillance an aerial vehicle may encounter a closed door. Opening a door may require rotating or turning the door knob or door handle. An aerial vehicle may be configured to perform these operations with its mounted devices (e.g., mechanical tools, sensors, and/or weapons). Knob turning capabilities will now be explained in more details in the context of FIGS. 4A-4C. It should be noted that in certain embodiments, an aerial vehicle is equipped with a device that can be used to break through an obstacle instead of or in addition to opening it. Examples of such devices include various forms of weapons, e.g., a shotgun, an explosive charge.

Figure 4A:
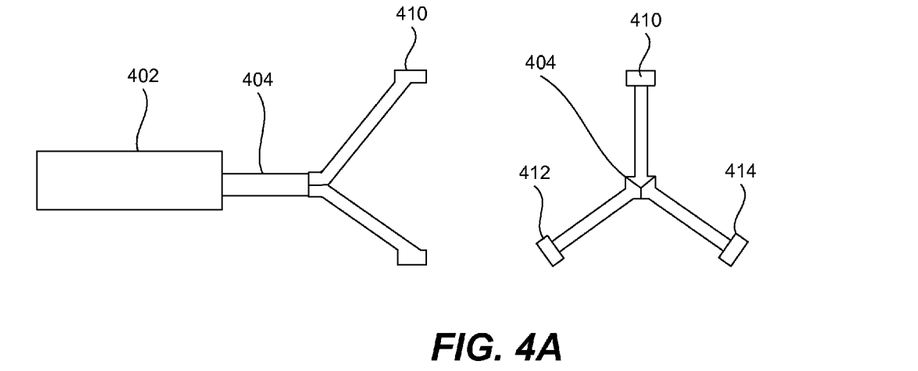
FIG. 4A illustrates a side and a front view of an aerial vehicle with a mechanical claw in accordance with certain embodiments.
Figure 4B:
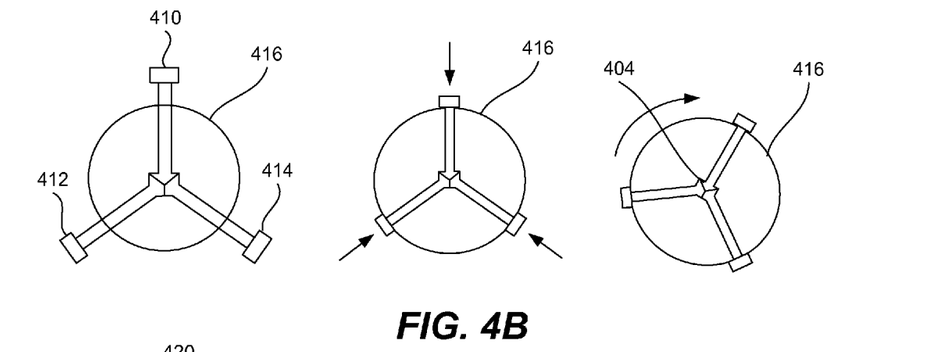
FIG. 4B illustrates different stages during a door knob opening operation in accordance with one embodiment.

FIG. 4A illustrates schematic side and front views of an aerial vehicle 402 with a mechanical claw 404 in accordance with certain embodiments. The claw is shown with three mechanical fingers 410, 412, and 414. At least one of the mechanical fingers is movable in order to provide pressure on an object in the claw. Alternatively, the vehicle itself can be thrust against an object to provide necessary pressure (e.g., to press on a door handle). FIG. 4B illustrates schematic front views of different stages during door knob opening in accordance with one embodiment. An aerial vehicle and/or a mechanical claw, if it is movable, can be moved into a position such that the mechanical fingers 410, 412, and 414 of the claw are positioned around the door knob 416. One or more fingers are then moved such that some or all fingers establish contact with the knob 416. Generally, certain pressure is provided between the fingers and the door knob. The amount of pressure depends on friction between the door knob and the fingers, torque required to turn the knob, and other factors.

It should be understood that the claw can have two, three, four, or any other greater number of mechanical fingers. For example, even the mechanical claw with two mechanical fingers may be capable of rotating the knob (establishing enough friction between the knob and the mechanical fingers to transfer the torque) if a contact of each of two mechanical fingers is sufficiently large. A three finger design may be easy to control to grab round objects, such as door knobs. However, four or more mechanical fingers may provide better torque transfer characteristics.

Once the mechanical fingers establish the contact with the knob 316, the claw may start rotating in order to unlatch the door. In certain embodiments, the claw rotates relative to the frame, while the position of the aerial vehicle is maintained. In other embodiments, the aerial vehicle itself rotates to provide a part or a full door knob rotation required for unlatching. Once the door knob unlatches, the aerial vehicle pulls or pushes the door using a motion of the mechanical claw or that of the entire apparatus. It should be noted that during the entire process, vertical lifters and/or horizontal thrusters may be used to stabilize and move, when necessary, the aerial vehicle with respect to the door knob.

Figure 4C:
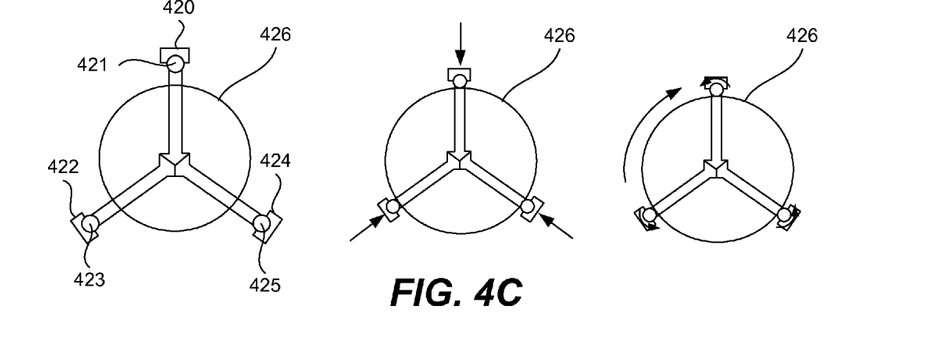
FIG. 4C illustrates different stages during a door knob opening operation in accordance with another embodiment.

FIG. 4C illustrates different stages during door knob opening in accordance with other embodiments. In these embodiments, the mechanical fingers 420, 422, and 424 of the mechanical claw include rollers 421, 423, and 425 that establish contact with the door knob 426. The rollers 421, 423, and 425 are configured to rotate relative to the mechanical fingers 420, 422, and 424, and at least one of the rollers is configured to exert torque onto the knob 426 to turn the knob. In this configuration, the mechanical claw and the mechanical fingers 420, 422, and 424 may remain stationary while the door knob 426 rotates.

In certain embodiments, an aerial vehicle may enter and exit through windows and other breakable surfaces by breaking through the surface with its own body (e.g., a part of the frame), a spring loaded or pneumatic punch, or an explosive device. For example, a vehicle may orient itself towards a surface with the part or device that is used for breaking this surface. In case of breaking with vehicle's own body, a vehicle may accelerate towards the surface. A speed at the point of contact with the surface depends on vehicle's weight and properties of the surface (e.g., materials, thicknesses, reinforcements).

In certain embodiments, an aerial vehicle is equipped with one or more of the following tools: a drill, a screwdriver, and a wrench. These tools as well as mechanical claw and other tools may rely on countervailing forces and/or torques generated by the vehicle to exert forces and/or torques on external objects. An aerial vehicle equipped with various tools may be used for maintenance of structures, indoor or outdoor.

Although the foregoing invention has been described in some detail for purposes of clarity of understanding, it will be apparent that certain changes and modifications may be practiced within the scope of the appended claims. It should be noted that there are many alternative ways of implementing the processes, systems and apparatus of the present invention. Accordingly, the present embodiments are to be considered as illustrative and not restrictive, and the invention is not to be limited to the details given herein.

What is claimed is:

1. A method, comprising:
   (a) receiving data collected from sensors mounted to a frame of an unmanned aerial vehicle, the unmanned aerial vehicle having a plurality of thrust units including a plurality of vertical lifters and one or more horizontal thrusters;
   (b) receiving instructions over a wireless interface to operate a mechanical claw connected to the frame;
   (c) receiving instructions over the wireless interface to close the mechanical claw on a door-opening device selected from the group consisting of a door knob, a door latch, and a door handle;
   (d) closing the mechanical claw on the door-opening device; and
   (e) receiving instructions to use the mechanical claw to open the door using the door-opening device.

2. The method of claim 1, further comprising: (f) independently controlling power levels applied to one or more of the thrust units to compensate for feedback resulting from operating the mechanical claw.

3. The method of claim 2, wherein:
   performing (f) comprises controlling the power levels applied to one or more of the vertical lifters to compensate for a torque applied through the mechanical claw.

4. The method of claim 2, wherein:
   the mechanical claw is configured to rotate relative to the frame, and performing (f) comprises controlling the power levels applied to one or more of the vertical lifters to compensate for a torque applied to rotate the mechanical claw relative to the frame.

5. The method of claim 2, wherein:
   the mechanical claw is fixed with respect to the frame, and performing (f) comprises controlling the power levels applied to one or more of the vertical lifters to compensate for a torque applied to an object remote from the unmanned aerial vehicle using the mechanical claw.

6. The method of claim 2, wherein:
   the mechanical claw is fixed with respect to the frame, and performing (f) comprises controlling the power levels applied to one or more of the vertical lifters to compensate for a torque applied to an object remote from the unmanned aerial vehicle using the mechanical claw.

7. The method of claim 2, wherein:
   the mechanical claw includes a plurality of fingers,
   each finger includes a roller configured to engage with a door knob when the mechanical claw is used to grasp the door knob,
   at least one of the rollers is configured to rotate with respect to the corresponding finger and exert torque on the door knob, and
   performing (f) comprises controlling the power levels applied to one or more of the vertical lifters to compensate for the torque or torques applied to the door knob by the at least one roller.

8. The method of claim 2, wherein (f) is performed by a controller based on feedback from the sensors.

9. The method of claim 1, wherein the sensors include one or more sensors selected from the group consisting of: inclinometers, gyroscopic sensors, range finders, and cameras.

10. The method of claim 1, wherein the plurality of thrust units generate thrust using fixed-pitch rotors.

11. A method, comprising:
   (a) receiving data collected from sensors mounted to a frame of an unmanned aerial vehicle, the unmanned aerial vehicle having a plurality of thrust units including a plurality of vertical lifters and one or more horizontal thrusters;
   (b) receiving instructions over a wireless interface to operate a rivet punch connected to the frame; and
   (c) independently controlling power levels applied to at least one of the one or more horizontal thrusters to compensate for feedback resulting from operating the rivet punch when the rivet punch is used to punch a rivet.

\* \* \* \* \*